INVENTOR.
RICHARD L. MACKEY

United States Patent Office 3,172,227
Patented Mar. 9, 1965

3,172,227
COMPOSITE FISH LURE
Richard L. Mackey, 28 Sandy Lane, Malvern, Pa.
Filed June 17, 1963, Ser. No. 288,424
5 Claims. (Cl. 43—42.09)

This invention relates to a composite fish lure of the type containing two or more main elements and in particular to a composite fish lure whose elements are easily interchangeable so that it may be easily modified by substituting one or more different elements having different coloration, configuration, weight, or mobility characteristics, etc.

While composite (sometimes called "convertible") fish lures have been heretofore produced and marketed, the various elements thereof have been tightly linked together so that essentially the composite lure moved as a single unit. Furthermore, the individual components of known composite lures are relatively difficult to couple and uncouple from one another. In addition, known composite lures do not provide for interchangeable elements which, though their general outward configuration and dimensions may be the same or similar, may differ markedly because of differences in their weight. Such interchangeable weight components provide the angler with a wide diversity of baits for use as local conditions or his own preference may dictate. Finally, no composite fish lure is known which includes means for producing noises that may attract fish under certain conditions.

It is, accordingly, among the objects of the present invention to provide:

(1) A composite fish lure whose elements are separately movable.

(2) A composite fish lure whose elements are easily engaged and disengaged from one another.

(3) A composite fish lure wherein some of the interchangeable elements may have generally similar overall characteristics yet totally different weights.

(4) A composite fish lure wherein one or more of the elements may be provided with means for producing fish-attracting noises as the lure moves through the water.

Other objects of the invention will occur to those skilled in the art upon examination of the drawings, specification and claims herein.

In accordance with my invention I provide a composite fish lure which includes simple yet effective means for coupling its head and body assemblies together. This coupling means includes a hook attached to one assembly and an eyelet attached to the other. A spring is mounted about the eyelet and extends toward the other assembly. The spring so mounted is of sufficient length that it can exert pressure against the other assembly when the hook is passed through the eye of the eyelet to keep the hook and eye in engaged position. The individual assemblies may be made in any shape, color, or size. They may be made either of a heavy metal such as lead or of a light plastic depending upon the characteristics desired as, for example, the rate at which the line sinks into the water.

I also provide that either the head or body assembly may be equipped with a pair of metallic blades close to one another for producing suitable fish-attracting noises in response to movement of the lure.

Figure 1:
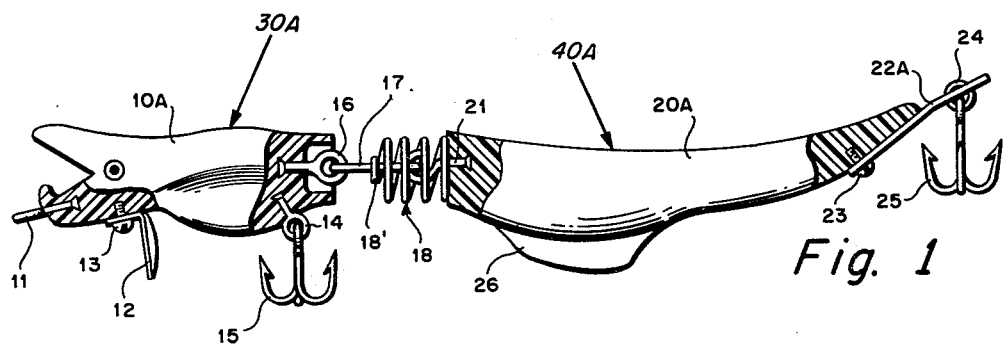
FIGURE 1 is a plan view of one form of my invention, partly in section, showing the general construction thereof and the convenient means for releasably coupling the various components together.
Figure 2:
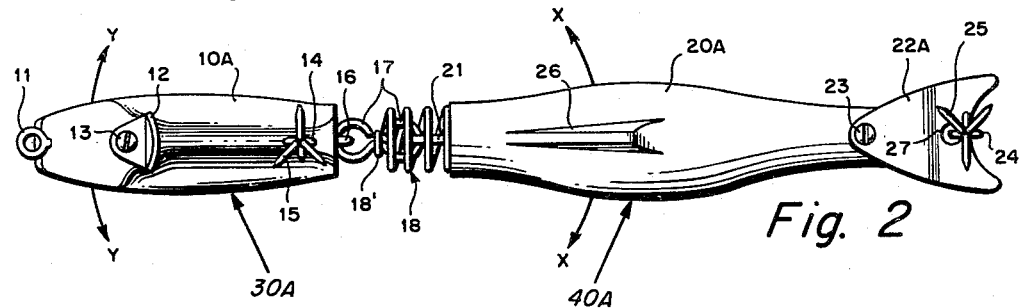
FIGURE 2 is a view of the apparatus shown in FIG. 1 taken from beneath it.

FIGURES 1 and 2 are views of a composite lure made in accordance with my invention. As shown it consists of a head assembly 30A and a body assembly 40A which are, in the case shown, both made of a suitable plastic material. The head assembly 30A includes a fishhead-simulating member 10A and an eyelet 11 affixed thereto to which the fishing line may be attached. A deflector 12 is affixed to the portion 10A by means of a screw 13 extending transversely to the long axis of member 10A and serves to impart lateral or wobbling movement to the head assembly and therefore the body assembly (although the respective rates of movement may be different) as the lure is pulled through the water. The direction of the head assembly wobble is shown by arrows Y—Y. An eyelet 14 is also embedded in the member 10A and a fish hook 15 is connected thereto. An eyelet 16 is also embedded in a recessed end portion of the member 10A and is connected to a double eyelet linkage member 17.

The body assembly 40A is shown with its stabilizer fin 26 on the underside for illustrative purposes although in actuality the assembly 40A normaly would be inverted so that the fin 26 would appear on the top side. The assembly 40A also includes a plastic body portion 20A having toward its rear end a bifurcated metallic deflector 22A which is attached to the member 20A by a screw 23. This deflector helps to wobble the assembly 40A laterally as indicated by the curved line X—X in FIG. 2 when the lure is pulled along during a retrieve. A ring 24 is passed through the aperture 27 and to the ring a fish hook 25 is connected.

A hook 21 is fixedly connected to the other end of the member 20A. A spring 18 has one end 18' anchored around the narrow middle portion of the double eyelet 17. The spring 18 extends sufficiently toward the right that it urges the assembly 40A toward the right when the hook 21 is passed through the right eye of the double eyelet 17, thereby keeping them engaged. To disengage the assembly 40A from the assembly 30A it is only necessary to move the assembly 40A to the left thereby compressing the spring 18 and permitting the opening in the hook 21 to clear the outer eye of eyelet 17 whereupon the assembly 40A can be removed.

Figure 3:
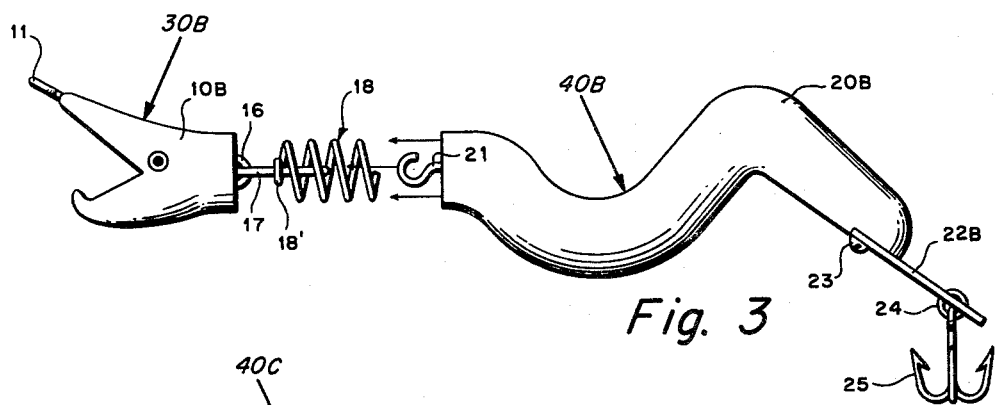
FIGURE 3 is a side elevation view of another form of my invention having a head assembly made of a different material than the body assembly and shown uncoupled therefrom.

The preceding embodiment of my invention consisted of a plastic essentially fish-like body assembly coupled to a plastic serpent-like head assembly. In the form of my invention shown in FIG. 3 there is a smaller serpent-like head assembly 30B and a snake-like or serpentine body assembly 40B. Parts identical to those in FIGS. 1 and 2 are numbered identically; similar parts bear similar numbers except that they include the letter "B" instead of the letter "A." One or both of the members 30B and 40B may be made of a material which is much heavier than the plastic members 30A and 40A of FIGS. 1 and 2. For example, the head 10B in FIG. 3 may be made of lead whereas the body 20B may be made of plastic. With this combination, the resultant composite lure is much heavier than if all plastic assemblies were to be used. This variation in weight affects the rate at which the lure sinks into the water as well as the movement of the lure through the water.

Figure 4:
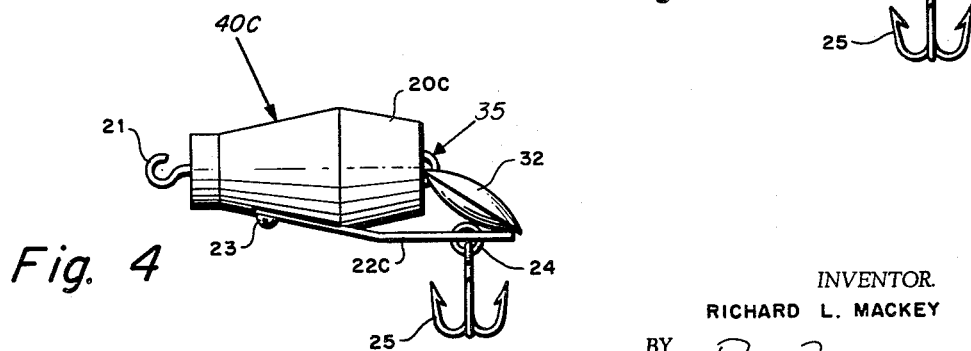
FIGURE 4 is a side elevation view of an alternative body assembly according to another form of my invention which depicts means for generating fish-attracting noises.

Another type of body assembly is shown at 40C in FIG. 4. This body assembly has appurtenances which are identical or similar to those in the preceding figures and which accordingly bear identical or similar numbers. In addition, however, there are a pair of clam-like plates or "clackers" of the hollow spoon shape sometimes called spinner blades 32 having apertures therein through which an eyelet 35 is passed, the latter being connected to the body 20C. As in previous embodiments the deflector 22C causes the assembly 40C to move laterally and this motion, together with the rush of water by the clackers, causes the latter to produce fish-attracting noises.

Thus, it may be seen that my invention provides a composite lure which is capable of existing in a number of different combinations varying in configuration, color, motion characteristics, weight, and noise-producing characteristics. Furthermore, these various combinations are facilitated by the provision of a quick and simple coupling means for interchanging different body assemblies.

In general use, the metallic blades are attached to the body assembly. It is possible to use the head alone as a lure. In fact, the ability to use a head alone, or a head and body combination, is an important feature of usefulness of the device, since the variability of the lure is increased.

Since other modifications and applications which do not depart from the essence of my invention will occur to those skilled in the art upon reading of this specification, I desire my invention to be limited only by the claims herein.

I claim:
1. A fish lure comprising:
   (a) a substantially rigid head assembly having a long axis which includes
      (i) a head portion,
      (ii) means affixed toward one end of said head portion to which a fishing line may be connected,
      (iii) eyelet means affixed toward the end of said head portion remote from the end thereof to which said line may be connected,
      (iv) a spring having one end fixedly connected to a certain point of said eyelet means and the other end free, said spring generally surrounding said eyelet means and normally projecting therebeyond, and
   (b) a substantially rigid body assembly having a long axis which includes
      (i) a body portion,
      (ii) hook means connected at one end of said body portion and constructed to engage said eyelet means, said spring engaging said last named end and held in condition thereby.
2. The fish lure according to claim 1 wherein a selected number of fish hooks are connected to selected parts of said assemblies.
3. The fish lure according to claim 1 with the addition of a pair of coacting hollow spoon blades connected to one point on one of said assemblies for producing noises in response to the movement of said assembly in the water.
4. The fish lure according to claim 1 with the addition of a deflector having a face extending transversely to the long axis of one of said assemblies for producing lateral movement of said assembly when said lure is pulled through the water.
5. The fish lure according to claim 1 wherein said head assembly is substantially entirely except for attachments made of a first material and said body assembly is substantially entirely except for attachments made of a second material, said second material having a substantially different density from said first material.

References Cited by the Examiner
UNITED STATES PATENTS

| | | | |
|---|---|---|---|
| 1,239,745 | 9/17 | Timerman | 24—239 X |
| 1,977,141 | 10/34 | Pflueger | 43—42.39 X |
| 2,441,302 | 5/48 | Watkin | 43—42.09 X |
| 2,602,256 | 7/52 | LeMaster et al. | 43—42.49 X |
| 2,909,863 | 10/59 | Rector et al. | 43—42.31 |
| 2,946,149 | 7/60 | Baker | 43—42.18 |
| 2,954,634 | 10/60 | Peschong | 43—42.09 |

FOREIGN PATENTS

| | | |
|---|---|---|
| 521,418 | 7/53 | Belgium. |

ABRAHAM G. STONE, *Primary Examiner.*